US012794759B2

(12) United States Patent
Vela et al.

(10) Patent No.: US 12,794,759 B2
(45) Date of Patent: Nov. 10, 2026

(54) MOBILE WIRELESS NETWORK MAINTENANCE USING LARGE LANGUAGE MODEL-BASED NETWORK PROTOCOL ANALYSIS TOOL

(71) Applicant: T-Mobile Innovations LLC, Overland Park, KS (US)

(72) Inventors: Mario Vela, Knoxville, TN (US); Michael John Raether, Deforest, WI (US); Dane Richard Osborne, Lenoir City, TN (US); Prakash Suman, Hudson, NH (US); Michael David Dienhart, Park Ridge, IL (US); Michael S. Irizarry, Barrington Hills, IL (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 202 days.

(21) Appl. No.: 18/912,845

(22) Filed: Oct. 11, 2024

(65) Prior Publication Data

US 2026/0106790 A1 Apr. 16, 2026

(51) Int. Cl.
*H04L 41/0631* (2022.01)
*G06F 40/205* (2020.01)
*H04L 43/10* (2022.01)

(52) U.S. Cl.
CPC ........ *H04L 41/0631* (2013.01); *G06F 40/205* (2020.01); *H04L 43/10* (2013.01)

(58) Field of Classification Search
CPC .... H04L 41/0631; H04L 43/10; G06F 40/205
See application file for complete search history.

(56) References Cited

U.S. PATENT DOCUMENTS

| | | | | |
|---|---|---|---|---|
| 2023/0403296 | A1* | 12/2023 | Pickman | H04L 63/1416 |
| 2024/0144141 | A1* | 5/2024 | Cella | G06Q 10/06375 |
| 2025/0181432 | A1* | 6/2025 | Cooper | G06F 12/0891 |
| 2025/0247108 | A1* | 7/2025 | Cooper | H03M 7/3059 |
| 2025/0247211 | A1* | 7/2025 | Roopan | H04L 9/0822 |
| 2025/0252376 | A1* | 8/2025 | Singh | G06F 9/454 |
| 2025/0259085 | A1* | 8/2025 | Crabtree | G06N 5/043 |
| 2026/0093414 | A1* | 4/2026 | Perez | G06F 3/0656 |

* cited by examiner

*Primary Examiner* — Benjamin M Thieu
(74) *Attorney, Agent, or Firm* — SHOOK, HARDY & BACON L.L.P.

(57) ABSTRACT

A system and method for detecting and correcting communications network protocol problems is described that is carried out based upon protocol packet trace log data provided by a network, parsed by an automated parsing tool, and processed by a large language model-based (LLM-based) protocol analysis tool trained using protocol analysis text. The method includes acquiring protocol packet trace information for a plurality of obtained protocol trace packets; parsing the protocol packet trace information for each of the plurality of obtained protocol trace packets to obtain a combined set of protocol event description structures; presenting a submission to the LLM-based protocol analysis tool to obtain a responsive structured text response that is based upon an LLM of the LLM-based protocol analysis tool processing the submission; and performing, in accordance with the responsive structured text response, a remedial operation with respect to the communications network protocol configuration.

17 Claims, 6 Drawing Sheets

```
{
  "timestamps_utc_ms": [
    "17090562661234",
    "17090563561234"
  ],
  "network_elements": [
    "SGW001",
    "ENB001"
  ],
  "protocols": [
    "GTP-C",
    "NAS"
  ],
  "error_codes": [
    "14",
    "10"
  ],
  "verbatim": "The PCAP analysis shows that SGW001 had an issue in the GTP-C control (error code 14 - Packet Delay exceeded) that was also associated with errors in ENB001 (error code 10 - RF Failure)"
}
```

PCAP analyzer

This is a PCAP analyzer that uses the Core Engineering LLM engine (WizardLML/WizardLML-13B-V1.2 model) to analyze PCAP protocol sequences. Load a small PCAP (100KB) and let the LLM take care of it!

Attach-CC8-10-12-23-....pcap

The PCAP file revealed the following insights:

The LTE protocol sequence provided is unsuccessful due to the Attach reject message. This indicates that the network denied the user equipment's (UE) request to attach to the Evolved Packet System (EPS) services, both for EPS services and non-EPS services. This was followed by a UECContextReleaseCommand with a NAS-cause of normal-release, and a UECContextReleaseComplete message, indicating that the UE's context was successfully released.

Protocol Sequence Analyzed:
b',S1AP/NAS-EPS|InitialUEMessage, Attach request, PDN connectivity request,S1AP/NAS-EPS|DownlinkNASTransport, Attach reject (EPS services and non-EPS services not allowed),S1AP|UEContextReleaseCommand [NAS-cause=normal-release],S1AP|UEContextReleaseComplete\n'

FIG. 5A

PCAP analyzer

This is a PCAP analyzer that uses the Core Engineering LLM engine (WizardLML/WizardLML-13B-V1.2 model) to analyze PCAP protocol sequences. Load a small PCAP (100KB) and let the LLM take care of it!

Attach-CC19-10-12-23-....pcap

The PCAP file revealed the following insights:

The LTE protocol sequence provided appears to be a failed attach and PDN connectivity process. The initial attach request was followed by a series of NAS-EPS messages related to authentication, security mode, ESM information, and an attach reject due to ESM failure. Despite the subsequent messages continued to be exchanged, including a PDN connectivity reject due to requested service option not being subscribed. The UEContextReleaseComplete and UECContextReleaseComplete messages indicate that the normal release process was initiated. Therefore, the LTE protocol sequence provided was not successful.

Protocol Sequence Analyzed:
b',S1AP/NAS-EPS|InitialUEMessage, Attach request, PDN connectivity request,S1AP/NAS-EPS|DownlinkNASTransport, Authentication request,S1AP/NAS-EPS|UplinkNASTransport, Authentication response,S1AP/NAS-EPS|DownlinkNASTransport, Security mode command,S1AP/NAS-EPS|UplinkNASTransport, Security mode complete,S1AP/NAS-EPS|DownlinkNASTransport, ESM information request,S1AP/NAS-EPS|UplinkNASTransport, ESM information response,S1AP/NAS-EPS|DownlinkNASTransport, Attach reject (ESM failure), PDN connectivity reject (Requested service option not subscribed),S1AP|UEContextReleaseCommand [NAS-cause=normal-release],S1AP|UEContextReleaseComplete,S1AP/NAS-EPS|InitialUEMessage, Attach request, PDN connectivity request,S1AP/NAS-EPS|DownlinkNASTransport, Authentication request,S1AP/NAS-EPS|UplinkNASTransport, Authentication response,S1AP/NAS-EPS|DownlinkNASTransport, Security mode command,S1AP/NAS-EPS|UplinkNASTransport, Security mode complete,S1AP/NAS-EPS|DownlinkNASTransport, ESM information request,S1AP/NAS-EPS|UplinkNASTransport, ESM information response,S1AP/NAS-EPS|DownlinkNASTransport, Attach reject (ESM failure), PDN connectivity reject (Requested service option not subscribed),S1AP|UEContextReleaseCommand [NAS-cause=normal-release],S1AP|UEContextReleaseComplete,S1AP/NAS-EPS|InitialUEMessage, Attach request, PDN connectivity request,S1AP/NAS-EPS|DownlinkNASTransport, Authentication request,S1AP/NAS-EPS|UplinkNASTransport, Authentication response,S1AP/NAS-EPS|DownlinkNASTransport, Security mode command,S1AP/NAS-EPS|UplinkNASTransport, Security mode complete,S1AP/NAS-EPS|DownlinkNASTransport, ESM information request,S1AP/NAS-EPS|UplinkNASTransport, ESM information response,S1AP/NAS-EPS|DownlinkNASTransport, Attach reject (ESM failure), PDN connectivity reject (Requested service option not subscribed),S1AP|UEContextReleaseCommand [NAS-cause=normal-release],S1AP|UEContextReleaseComplete\n'

FIG. 5B

PCAP analyzer

This is a PCAP analyzer that uses the Core Engineering LLM engine (WizardLML/WizardLML-13B-V1.2 model) to analyze PCAP protocol sequences. Load a small PCAP (100KB) and let the LLM take care of it!

esm_pdn_connect_1....pcap

The PCAP file revealed the following insights:

The LTE protocol sequence is a successful one. The sequence starts with the initial attach request, followed by the EPS's identity check request, which the network responds with the identity check answer. The UE then establishes the default EPS bearer context, which is accepted by the network. The UE then modifies the bearer, which is also successfully processed by the network.

After that, the UE requests PDN connectivity, and the network responds with a ciphered message. The UE then sends a detach request, which the network processes with the delete session request and subsequent responses. The UE context release command and subsequent complete message confirm that the UE context is successfully released.

Overall, the UE's request and the network responses are successfully processed indicating a successful protocol sequence.

Protocol Sequence Analyzed:
b",S1AP/NAS-EPS|InitialUEMessage, Attach request, PDN connectivity request,GTPv2|Create Session Request,GTPv2|Create Session Request,GTPv2|Create Session Request,GTPv2|Create Session Request,GTPv2|Create Session Request,DIAMETER|cmd=3GPP-ME-Identity-Check Request(324) flags=RP-- appl=3GPP S13/S13'(16777252) h2h=219a287 e2e=219a287 ,DIAMETER|cmd=3GPP-ME-Identity-Check Answer(324) flags=-P-- appl=3GPP S13/ S13'(16777252) h2h=219a287 e2e=219a287 ,GTPv2|Create Session Response|cause_code:16,16,GTPv2|Create Session Response|cause_code:16,16,GTPv2|Create Session Response|cause_code:16,16,GTPv2|Create Session Response|cause_code:16,16,GTPv2|Create Session Response|cause_code:16,16,S1AP/NAS-EPS|InitialContextSetupRequest, Ciphered message,S1AP|UECapabilityInfoIndication, UECapabilityInformation,S1AP|InitialContextSetupResponse,S1AP/NAS-EPS|UplinkNASTransport, Attach complete, Activate default EPS bearer context accept,GTPv2|Modify Bearer Request,GTPv2|Modify Bearer Request,GTPv2|Modify Bearer Request,GTPv2|Modify Bearer Request,S1AP/NAS-EPS|DownlinkNASTransport, Ciphered message,GTPv2|Modify Bearer Response|cause_code:16,16,GTPv2|Modify Bearer Response|cause_code:16,16,GTPv2|Modify Bearer Response|cause_code:16,16,GTPv2|Modify Bearer Response|cause_code:16,16,S1AP/NAS-EPS|UplinkNASTransport, PDN connectivity request,S1AP/NAS-EPS|DownlinkNASTransport, Ciphered message,S1AP/NAS-EPS|UplinkNASTransport, Detach request (EPS detach / switch-off),GTPv2|Delete Session Request,GTPv2|Delete Session Request,GTPv2|Delete Session Request,GTPv2|Delete Session Request,GTPv2|Delete Session Request,GTPv2|Delete Session Response|cause_code:16,GTPv2|Delete Session Response|cause_code:16,GTPv2|Delete Session Response|cause_code:16,GTPv2|Delete Session Response|cause_code:16,GTPv2|Delete Session Response|cause_code:16,S1AP|UEContextReleaseCommand [NAS-cause=detach],S1AP|UEContextReleaseComplete\n"

FIG. 5C

MOBILE WIRELESS NETWORK MAINTENANCE USING LARGE LANGUAGE MODEL-BASED NETWORK PROTOCOL ANALYSIS TOOL

FIELD OF THE INVENTION

This invention relates generally to the field of mobile wireless communications networks. More particularly, the invention is directed to maintaining the automated protocols implemented by network management components of mobile wireless networks.

BACKGROUND OF THE INVENTION

Radio access networks (RAN) and core networks constitute essential components in all mobile wireless communications networks. Moreover, RAN components such as antennas and associated signal transmitting/receiving electronics hardware are subject to changes for any of a variety of reasons, including equipment failures and changes in usage patterns. Likewise, malfunctioning and/or misconfigured core network components can severely cripple operation of a mobile wireless network. While a variety of network performance monitoring tools are available, their output often does not provide readily identifiable network faults or configuration errors.

Network communications protocol analysis is an area where determination of a fault or need for taking a corrective action is particularly challenging. There are a large number of such protocols (E.g., S1AP, GTPv2, DIAMETER, SIP, etc.), and the protocols themselves do not operate in isolation from one another, but rather such protocols interact to provide an overall network service performance level for a variety of network services—both individually and as a whole. As such, network operation assurance activities for telecommunications networks require a thorough understanding of underlying network communication protocols used for provide particular network services (e.g., voice, data, etc.). Such high level of network communication protocol knowledge is difficult to transfer to others or capture in complex programmed analytical tools. As a consequence, detecting and correcting network faults and configuration errors remains a complex and manual effort-intensive task to carry out with a high degree of confidence by network operations management teams. Typically, such task is carried out by network engineers collecting protocol records in the form of packet trace logs (e.g., packet capture (PCAP) logs) for specific scenarios that are decoded and analyzed by specialized software to understand inter-relationships of various network protocols involved in carrying out one or more network services with the goal of understanding a root cause of degraded/failed network functionality.

Maintaining a high level of performance of communications networks is needed now more than ever due to the high level of demand for high quality RAN and core network (e.g., broadband backhaul) connections supporting high data rates to support a wide range of mobile wireless device services (e.g., VoLTE, streaming media, SMS, etc.) and applications with high data rate requirements as well as mobility—which adds another layer of complexity do to varying demands for communications services arising from wide variations in usage of communication network resources that can occur in a matter of hours or even minutes. One way to ensure a high level of operation of networks to handle high demand is to ensure that the underlying network protocol configurations have been properly implemented for any given scenario—which may change at any given instant due to a particular event (e.g. a sporting contest at a large stadium that primarily sits empty when not in use, a catastrophic weather event causing massive damage to network equipment, etc.).

SUMMARY OF THE INVENTION

Embodiments of the invention are used to provide a method, non-transitory computer readable medium, and a computer system configuration facilitating and performing operations for analyzing protocol packet traces and identifying protocol configuration errors/problems. To that end, a method carried out by such system computer-executable code is provided for managing, including correction, of a communications protocol configuration based upon protocol packet trace log data provided by a network, parsed by an automated parsing tool, and processed by a large language model-based (LLM-based) protocol analysis tool trained using protocol analysis text.

The method includes acquiring protocol packet trace information for a plurality of obtained protocol trace packets. The method further includes parsing the protocol packet trace information for each of the plurality of obtained protocol trace packets to obtain a combined set of protocol event description structures, wherein each protocol event description structure includes: an identifier of a network protocol and a corresponding event code. The method, thereafter, further includes presenting a submission to the LLM-based protocol analysis tool to obtain a responsive structured text response that is based upon an LLM of the LLM-based protocol analysis tool processing the submission, wherein the submission includes at least the set of protocol event description structures. Moreover, the method includes performing, in accordance with the responsive structured text response, a remedial operation with respect to the communications protocol configuration.

BRIEF DESCRIPTION OF THE DRAWINGS

While the appended claims set forth the aspects of the present invention with particularity, the invention and its advantages are best understood from the following detailed description taken in conjunction with the accompanying drawings, of which:

FIGS. 5A, 5B and 5C provide examples of structured text output rendered by the the LLM-based protocol analysis tool in accordance with the current disclosure.

DETAILED DESCRIPTION OF THE DRAWINGS

Exemplary embodiments of the invention described herein acquire and process a variety of network protocol trace packets to render, from a centralized remote monitoring and administration center, network protocol performance information that is subsequently evaluated to identify changes to configuration of network protocol configurations that are thereafter carried out on the communications network components of interest.

The system and method described herein identify communications network protocol configuration faults/problems/errors. Such issues may arise in any of a variety of scenarios including network equipment faults/failures and significant changes to usage of particular network resources arising from an event. Such identification of communications network protocol configuration issues and taking remedial actions may be carried out in an automated manner—aided by an LLM-based protocol analysis tool in accordance with the present disclosure.

The described exemplary system utilizes an LLM that has been pre-trained using protocol analysis text. One such example of a pre-trained LLM is the WizardLM model which has been demonstrated to understand and identify errors in parsed packet capture (PCAP) logs by the TShark parser of the WIRESHARK packet decoder tool. While the WizardLM model/Tshark combination has been shown to support the analysis/error detection capabilities described herein, the current disclosure is not limited to such solution combination as the presently disclosed protocol analysis functionality may be carried out via any one of a variety of trainable LLMs and protocol packet trace log parser programs.

Figure 1:
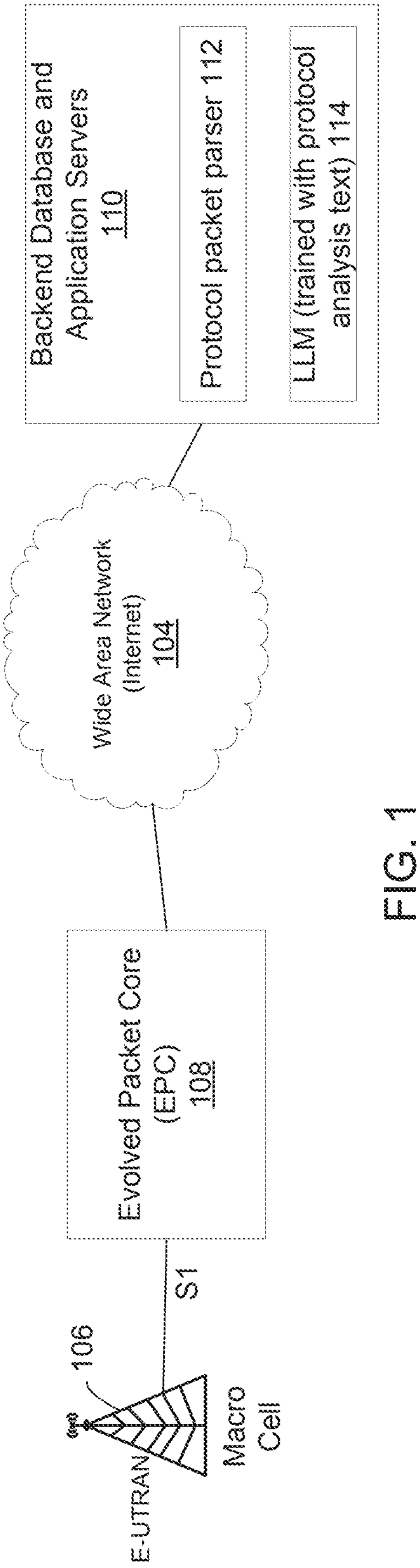
FIG. 1 is a schematic diagram illustrating a mobile wireless network environment interfaced to a broadband digital data network providing access to a variety of application servers in accordance with the present disclosure.

Turning to FIG. 1, an exemplary network environment is schematically depicted that includes monitoring and management components facilitating acquiring, parsing and processing a variety of protocol packet capture trace logs in accordance with the present disclosure. The schematic diagram depicts physical/structural components of an illustrative embodiment of the invention carried out in an exemplary (e.g., LTE or Long Term Evolution) mobile wireless data network environment. The environment depicted in FIG. 1 is substantially simplified, as one skilled in the art would readily observe. In an implementation, thousands of cell towers (base stations), such as a macrocell 106 comprising one or more antennas acquire and aggregate wireless data packets used to render protocol packet capture data sets value sets. The macrocell 106 is, for example, a Long Term Evolution (LTE) EnodeB Macro Cell.

The macrocell 106, by way of example, includes radio bearer resources and other transmission equipment necessary for wireless communication of information. The macrocell 106 includes one or more transceiver-antenna combinations. In the case of sectorized macrocells, two or more antennas are provided to cover particular parts of an area (actually a volume of space, discrete coding scheme, or sinusoidal phase offset) covered by the macrocell 106. A typical arrangement for a cellular communications macrocell is a tri-sector arrangement where three static areas are arranged in carefully engineered "n" degrees of rotational displacement from one another. Macrocells (and cells in general), come in a variety of forms, and there is no intention to limit the scope of the disclosed examples to any particular arrangement. More generally, there is no intention to limit the disclosure to the exemplary environment schematically depicted in FIG. 1 since the described management system and scheme for detecting problematic mobile wireless network protocol configurations applies to a wide variety of components of a mobile wireless network including protocol configurations of the radio access network and the core network.

The scaling of base stations within the network continues to grow as smaller base station solutions continue to emerge through wireless innovation. (i.e., picocells, femtocells, hotspot solutions, etc.). Each of the base stations is capable of acquiring thousands, even millions, of data points, for generating protocol packet capture data, during a period of observation used to develop a model/criterion for a properly operating network protocol.

The information used for forming protocol packet capture data is forwarded by the macrocell 106 via an S1 interface (in the illustrative example) to an evolved packet core (EPC) 108 (in the illustrative LTE mobile wireless communications network environment). The EPC 108, in turn, provides the acquired/forwarded protocol packet capture data via a wide area network (Internet) 104 to a backend databases and application servers 110. By way of a particular example, the sources of protocol packet capture data include: (1) eNodeB sources providing directly captured OSI Layer 2 (Data Link) and Layer 3 (Network) data; and (2) Operating Support System (OSS) Operations and Management related performance metrics.

Furthermore, by way of illustrative example, protocol analysis is carried out with regard to control plane protocols. In such case, the S1-AP (as opposed to the user plane S1-U interface) is used. In accordance with various implementation of the present disclosure, operation of the protocol analysis tool described herein can be used for identifying/diagnosing protocol errors for any of a variety of protocols including, for example, GTP-C, DIAMETER, SIP, etc.

The backend databases and application servers 110 include a protocol packet parser 112 and a Large Language Model (LLM) trained with protocol analysis text 114. By way of example, the protocol parser 112 is the TShark WIRESHARK packet decoder tool. By way of example, the LLM trained with protocol analysis text 114 is the WizardLM LLM with 13 Billion parameters running in 2 NVIDIA RTX8000 GPUs which provide the inference engine for analyzing provided parsed protocol packets including identified events/errors and rendering a text output summarizing one or more potential sources/causes for such events/errors.

The function and operation of backend databases and application servers 110, in the context of the present disclosure, are described herein below with reference to FIGS. 2-4.

The illustrative mobile wireless data network infrastructure/environment depicted in FIG. 1 is not intended to limit the invention with regard to alternative network topologies. Rather, it is intended to provide a visualization of a network architecture suitable for incorporating the described protocol packet capture log and network protocol configuration issue identification and remediation tool in accordance with the present disclosure. Other examples include a wireless access network complying with one or more of CDMA2000, WCDMA, UMTS, GSM, GPRS, EDGE, Wi-Fi (i.e., IEEE 802.11x), Wi-MAX (i.e., IEEE 802.16), 5G or similar telecommunication standards configured to deliver voice and data services to mobile wireless end user devices.

Moreover, the source of protocol packet capture log data is not limited to data directly acquired by RAN interface nodes (e.g. macrocell 106). For example, protocol packet capture log data may also be acquired and accumulated/stored on mobile wireless devices. In such case, the application program interfaces (APIs) on the mobile device capture such data from network devices and network functions (NFV) in 5G networks.

Figure 2:
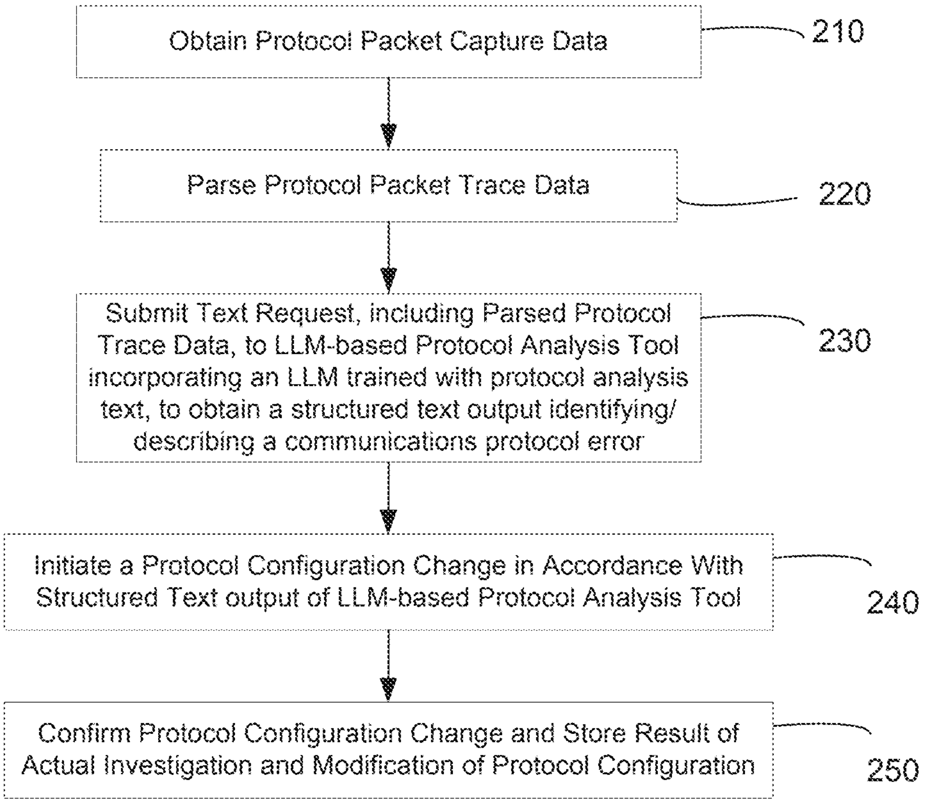
FIG. 2 is a flowchart summarizing a set of operations for carrying out a method of analyzing protocol packet traces using a large language model (LLM)-based protocol analysis tool to render structured text output identifying/describing a protocol error and thereafter perform, in accordance with the structured text output, a corrective/remedial action with regard to one or more communications protocol configurations in accordance with the present disclosure.
Figures 3, 4:
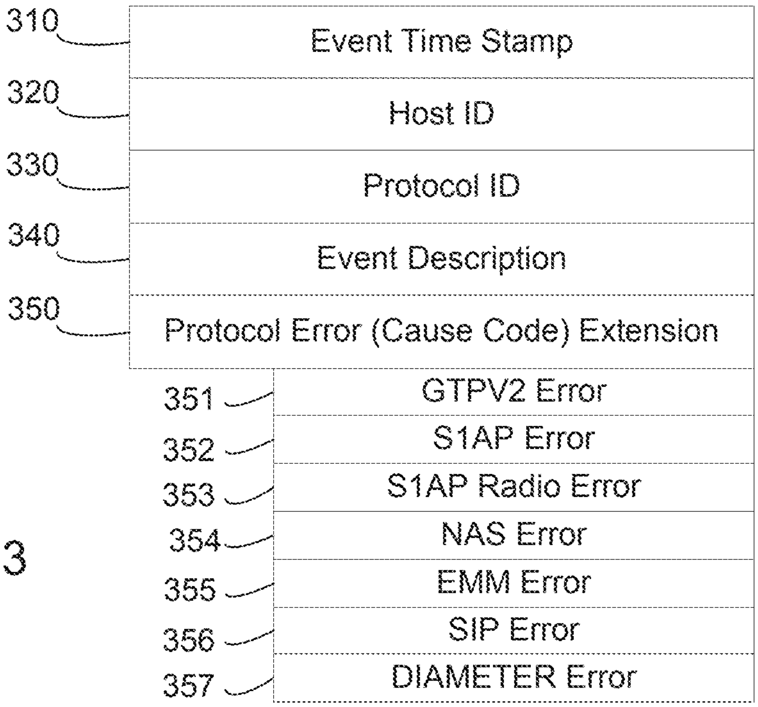
FIG. 3 is an exemplary input data structure processed by the LLM-based protocol analysis tool in accordance with the current disclosure.
FIG. 4 is an exemplary output data structure provided by the LLM-based protocol analysis tool in accordance with the current disclosure.

As those of ordinary skill in the art will appreciate, the foregoing network elements of the mobile wireless system of FIG. 1, including particular elements of the backend database and application servers 110, described herein below with reference to FIGS. 2-4, are implemented via telecommunications network equipment having one or more computer processors, as well as non-transitory computer readable media, such as RAM/ROM, solid-state memory, and/or hard drive memory and the like, which store computer executable instructions for executing embodiments of the methods described in further detail below.

Turning to FIG. 2, a flowchart is provided that summarizes, by way of example, a combination of operations for carrying out a method of analyzing protocol packet traces by a protocol analysis tool that uses a large language model (LLM), trained with protocol analysis text, to identify a protocol error and thus facilitate rendering a corrective/remedial action with regard to one or more communications network protocol configurations.

During 210 protocol packet capture data is acquired. Examples of types of communications protocols for which protocol packet capture data is acquired include, for example: S1AP, GTPv2, DIAMETER and SIP. Each of the different types of protocol packet capture data types has a corresponding set of "cause" codes identifying an exception encountered by the protocol packet. By way of example, the protocol packets are obtained and aggregated in packet capture (PCAP) logs. Such logs may be accumulated manually or by automated processes that receive and package the received protocol packet traces for further processing by the protocol packet parser 112 during 220.

During 220 the protocol packet capture log data is parsed, for example, by the TShark parser of the WIRESHARK packet decoder tool resulting in parsed protocol packet output. An example of such parsed protocol packet output, that is thereafter submitted to the LLM 114, is provided in FIG. 3 and includes the following set of exemplary fields for a protocol packet-related event embodied in the obtained protocol packet capture log data.

An Event time stamp 310 includes a time value of a protocol packet-related event provided, for example, in epoch format.

A Host ID 320 includes an identifier of a host internet protocol source for the protocol packet-related event.

A Protocol 330 identifies a network protocol corresponding to the protocol packet-related event.

An Event Description 340 includes an identifier of a specific protocol event that indicated a protocol error.

A protocol error (cause code) extension 350 includes, based on the protocol packet type and presence of a particular error (or lack thereof), one or more of the following (exemplary) group of error (analysis result) codes:

A GTPV2 error 351: error code for GTP event;

A S1AP error 352: error code for S1AP event;

S1AP Radio error 353: error code for S1AP radio network error;

NAS error 354: NAS error code;

EMM error 355: EMM error code;

SIP error 356: SIP error code;

DIAMETER error 357: DIAMETER error code.

Thus, the parsed output includes, for example, fields arranged as follows:

Protocol|Event Info|[event1|error_code1]|[event2|error_code2]| . . . .

Multiple parsed protocol packets (events) are grouped and presented in a single submission to the LLM 114 by delimiting each parsed protocol packet (event) data element by, for example, a "comma" text character. The resulting "comma separated" sequence is inserted into a text prompt submitted to the LLM 114. Furthermore, the returned values of the protocol error extension 350 includes both "good" and "bad" events/results, and as such are appropriately referred to as event "cause codes" and not merely "error" identifiers.

As noted above, processing of the PCAP logs during 220 is carried out, by way of example, by the WIRESHARK packet decoder tool. The output, upon completion of the parsing during 220 is, by way of example, in the following form for each processed protocol packet for which an event/error is identified:

{protocol ID}|{protocol info}|{cause code info},{protocol ID}|{protocol info}|{cause code info}, etc. . . .

An illustrative example of a syntax for the parsing performed by the WIRESHARK packet decoder tool, is as follows:

```
tshark -Y '(s1ap or gtpv2 or diameter or sip)' -Eseparator='|' -T fields -e
__ws.col.Protocol -e __ws.col.Info -e gtpv2.cause -e s1ap.Cause -e s1ap.radioNetwork -e
s1ap.nas -e nas__eps.emm.cause -r {0} | sed -e \"s/id-.*,//g\" | awk -F\| '{{ if(length($3) > 0
&& $3 != \" \"){{a=a\",\"$1\"|\"$2 \"[GTPv2.cause__code:\"$3}} else {{a=a\",\"$1\"|\"$2}};
if(length($4)>0){{a=a\"|s1ap.cause__code:\"$4}} ;
if(length($5)>0){{a=a\"|radionetwork.cause__code:\"$5}} ;
if(length($6)>0){{a=a\"|nas.cause__code:\"$6}} ;
if(length($7)>0){{a=a\"|emm.cause__code:\"$7}}}} END{{ print a}}'
```

The above-provided packet decoding syntax example is able to: (1) identify/decode protocol messages in the S1AP, GTPv2, DIAMETER, and SIP protocols; and (2) provide associated cause codes in GTP, S1AP, NAS, and EMM cause code format/form. Other network protocols and associated cause codes are contemplated in accordance with implementations of the presently disclosed system and operations for analyzing protocol packets and associated network errors indicated therein.

An example of an output of the protocol packet parser 112, in accordance with the above-provided syntax is as follows:

```
S1AP/NAS-EPS|InitialUEMessage, Attach request, PDN
connectivity request,S1AP/NAS-EPS|DownlinkNASTransport,
Attach reject (EPS services and non-EPS services not
allowed)|emm.cause__code:8,S1AP|UEContextReleaseCommand [NAS-
cause=normal-
release]|s1ap.cause__code:2|nas.cause__code:0,S1AP|UEContextRel
easeComplete.
```

The parsed output is thereafter packaged/presented as a request to the LLM 114 according to the following example.

Please tell me if the below LTE protocol sequence is a successful one or not (and why) in less than 100 words. Start with 'The PCAP file analysis revealed the following insights:'
',S1AP/NAS-EPS|InitialUEMessage, Attach request, PDN connectivity request,S1AP/NAS-EPS|DownlinkNASTransport, Attach reject (EPS services and non-EPS services not allowed)|emm.cause_code:8,S1AP|UEContextReleaseCommand [NAS-cause=normal-release]|s1ap.cause_code:2|nas.cause_code:0,S1AP|UEContextReleaseComplete'

The above-provided example of a submission to the LLM 114 is exemplary in nature. The prompt/request can be presented in any of a variety of ways and modified to allow for longer/shorter output (e.g. 50 words, 200 words, etc.) as well as to process the parsed protocol packet for technologies beyond LTE.

During 230, the LLM-based protocol analysis tool, including the appropriately trained LLM (e.g., the WIZARDLM LLM), processes the above-described submission, including the parsed protocol packet capture log data rendered by the parser during 220, to render text output of the LLM-based protocol analysis tool. The rendered text output is stored in a network protocol analysis results data storage in the form of readable text containing a concise identification of protocol cause codes generated by the LLM-based protocol analysis tool in accordance with the provided parsed protocol packet capture log data.

Turning to FIG. 4, an example is provided of a JavaScript Object Notation (JSON) data structure format for the output provided by the LLM tool (based on post-processing the conversational text output rendered by the LLM 114 during 230). The output data structure of the LLM tool incorporating the LLM 114 contains, for example, for the purpose of automating initiation of remedial measures, information that: (1) identifies the target network element(s) that is currently experiencing an identified fault/issue; and (2) an associated failure. In accordance with the present disclosure, in an illustrative example, the above-noted failure information is analyzed/processed by automated network management/maintenance logic that considers an identified issue presented in the LLM 114 output text, a wider network context, to assess an impact of the identified failure/fault on operation of the network and take remedial action in the broader context of the network operation as a whole.

FIGS. 5A, 5B and 5C provide multiple illustrative examples of actual structured text output rendered by the LLM 114 in response to the exemplary format/structure of input text provided herein above.

In the provided protocol sequence examples, there are two error scenarios and one successful scenario. The first scenario (FIG. 5A) occurs when the user equipment (UE) sends an Attach request message to the MME (Mobility Management Entity) using the slap protocol. However, the MME responds with an Attach reject message, indicating that EPS services and non-EPS services are not allowed. This response indicates that the UE's request was not granted due to a lack of supported services.

The second error scenario (FIG. 5B) occurs when the MME sends a UE context release message to the UE, due to an ESM Failure caused by the UE requesting a service option not subscribed.

The success scenario (FIG. 5C) includes a successful outcome message that indicates the UE has received and processed the release message from the MME.

During 240, based on the one or more communication protocol errors identified in the structured text output of the LLM 114 during 230, initiates a protocol configuration change addressing the error(s) identified in the structured text output.

During 250, in a feedback arrangement, the remedial actions taken during 240 are verified/tested by running further protocol packets through the network resulting in further protocol packet traces (operation 210) that are thereafter parsed (operation 220) and the parsed results presented and processed (operation 230) in accordance with the present disclosure.

FIG. 4 is an exemplary output data structure provided by the LLM-based protocol analysis tool in accordance with the current disclosure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for managing, including correction, of a communications protocol configuration based upon protocol packet trace log data provided by a network, parsed by an automated parsing tool, and processed by a large language model-based (LLM-based) protocol analysis tool trained using protocol analysis text, the method comprising:

acquiring protocol packet trace information for a plurality of obtained protocol trace packets;

parsing the protocol packet trace information for each of the plurality of obtained protocol trace packets to obtain a combined set of protocol event description structures, wherein each protocol event description structure includes: an identifier of a network protocol and a corresponding event code;

presenting a submission to the LLM-based protocol analysis tool to obtain a responsive structured text response that is based upon an LLM of the LLM-based protocol analysis tool processing the submission, wherein the submission includes at least the set of protocol event description structures; and performing, in accordance with the responsive structured text response, a remedial operation with respect to the communications protocol configuration.

2. The method of claim 1, wherein the protocol packet trace log data is provided by radio access network interface nodes.

3. The method of claim 1, wherein the protocol packet trace log data is provided by core network elements.

4. The method of claim 1, wherein the protocol packet trace log data is provided by user equipment.

5. The method of claim 1, wherein the protocol packet trace log data is acquired from trace logs generated on user equipment via an application program interface running on the user equipment that captures the protocol packet trace log data of network components.

6. The method of claim 1, wherein the LLM-based protocol analysis tool comprises a pre-trained WizardLM LLM.

7. The method of claim 1, wherein the protocol packet trace information comprises protocol packets aggregated in a packet capture (PCAP) log.

8. The method of claim 1, wherein during the protocol event description structure comprises a protocol identifier and an event description.

9. The method of claim 8, wherein the event description includes a cause code.

10. The method of claim 9, wherein the cause code indicates a protocol error.

11. The method of claim 9, wherein the cause code indicates a GPRS Tunneling Protocol (GTP) error.

12. The method of claim 9, wherein the cause code indicates an S1 Application Protocol (S1AP) error.

13. The method of claim 9, wherein the cause code indicates an S1 Application Protocol (S1AP) Radio error.

14. The method of claim 9, wherein the cause code indicates a Non-access stratum (NAS) error.

15. The method of claim 9, wherein the cause code indicates an EPS Mobility Management (EMM) error.

16. The method of claim 9, wherein the cause code indicates a Session Initiation Protocol (SIP) error.

17. The method of claim 9, wherein the cause code indicates a DIAMETER protocol error.

* * * * *